Feb. 24, 1948.   R. BOWN   2,436,376
SYSTEM FOR TRANSMITTING INTELLIGENCE
Filed March 31, 1944   2 Sheets-Sheet 1
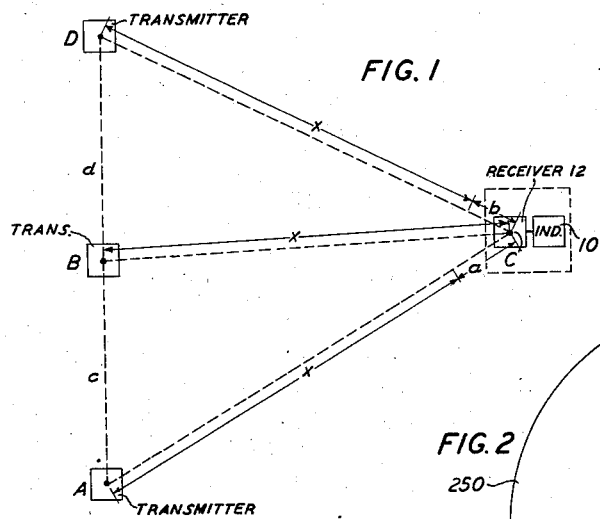
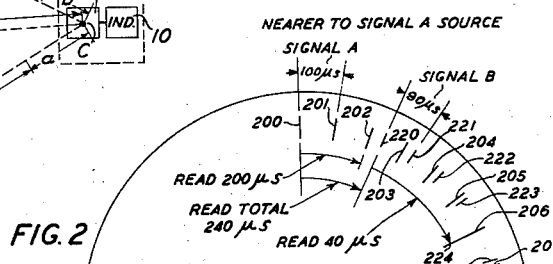
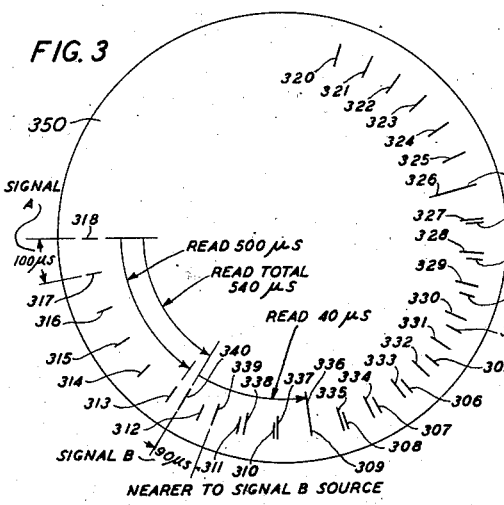
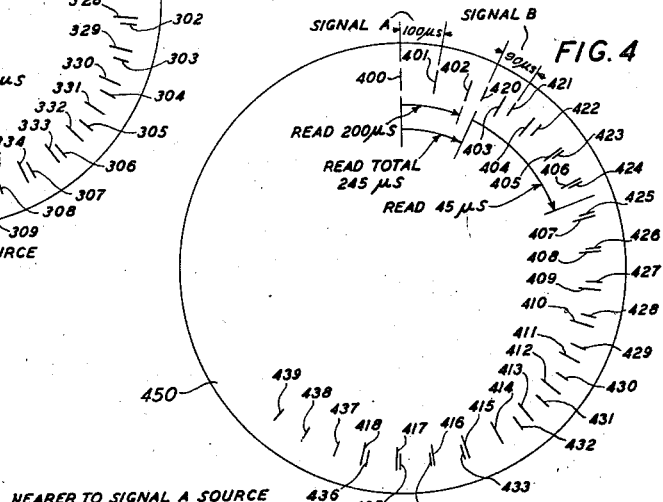
INVENTOR
R. BOWN
BY
H. O. Wright
ATTORNEY FIG. 5
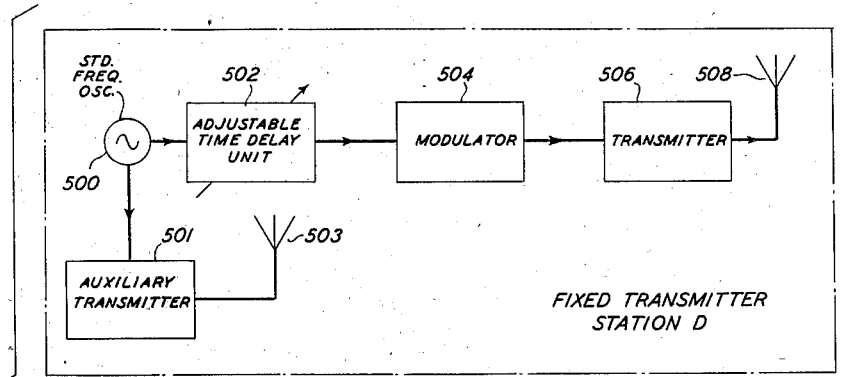
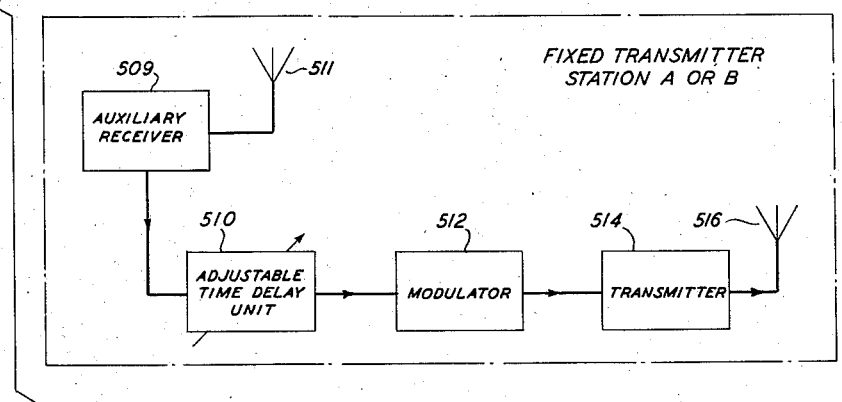
FIG. 6
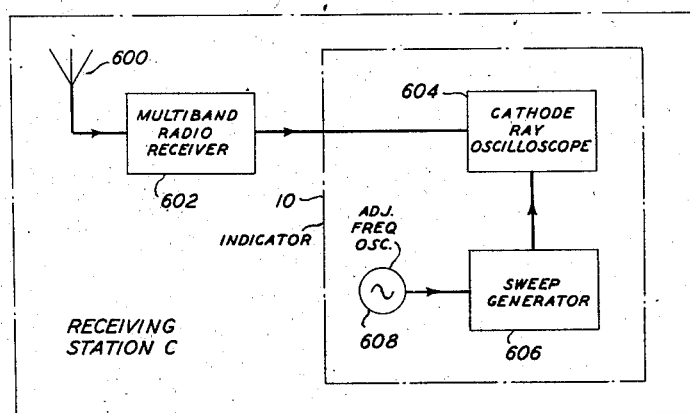
INVENTOR
R. BOWN
BY H. O. Wright
ATTORNEY Patented Feb. 24, 1948

2,436,376

UNITED STATES PATENT OFFICE 2,436,376

SYSTEM FOR TRANSMITTING INTELLIGENCE

Ralph Bown, Maplewood, N. J., assignor to Bell Telephone Laboratories, Incorporated, New York, N. Y., a corporation of New York Application March 31, 1944, Serial No. 528,862

3 Claims. (Cl. 250—11)

1

This invention relates to long range navigation systems for mobile craft and to improved methods and arrangements for use in such systems.

In systems of the invention, particular different combinations of energy impulses are emitted at intervals from selected pairs of a plurality of transmitting stations, the stations being at known fixed positions. The impulses from successive selected pairs of the plurality of transmitting stations are received on a mobile craft and the time interval at the receiving point between the impulses received from each pair of transmitting stations is measured. Alternatively simultaneous transmission from all transmitting stations but on separate wavelengths for each station or each pair of stations can be employed and selective receiving devices can be employed at the mobile craft to select the signals of the various pairs of the transmitting stations as desired. The position of the mobile craft can then be determined, as will be explained in detail hereinafter, with respect to the several transmitting stations.

A particular feature of the invention is the use of pulse combinations for the stations of each given pair which bear a vernier relation to each other whereby when the pulses from both stations of a selected pair are displayed simultaneously on an indicator, an accurate reading of the time interval between the arrival of the two combinations of pulses is facilitated.

Objects of the invention are, accordingly, to provide improved long range navigation and position determining systems for mobile craft and to facilitate the determination of time intervals between two received pulse combinations or signals at a receiving station.

Other and further objects will become apparent during the course of the following description and in the appended claims.

The nature and principles of the invention will be more readily understood in connection with the following description of illustrative embodiments shown in the accompanying drawings in which:

Fig. 1 indicates in block diagram form a system which employs the principles of the invention;

Figs. 2 to 4, inclusive, illustrate the type of indications obtained with systems of the invention of the type which employ pulse combinations bearing a vernier relation to each other;

2

Fig. 5 illustrates in block-diagram form a conventional arrangement of the transmitting stations of Fig. 1 appropriate for use in systems of the invention; and Fig. 6 illustrates in block-diagram form a conventional arrangement of the receiving station of Fig. 1 appropriate for use in systems of the invention.

In more detail, in Fig. 1, A, B and D are transmitting stations located at known fixed positions. Block 12 represents a receiver at station C provided with an indicator 10 and located on a mobile craft the position of which with respect to the transmitting stations is to be determined.

The difference between the distance BC (from receiver 12 to transmitter B), and the distance AC (from receiver 12 to transmitter A) can, of course, be determined by the simple process of emitting short pulses simultaneously from both transmitters, receiving both pulses at receiver 12 and determining the time interval elapsing between the receipt of the two pulses. For purposes of identification one or more additional pulses may follow the first pulse from each station, the spacings of such auxiliary pulses being distinctly different for each transmitting station so that the origin of the several pulses can be readily determined at the receiving station. To provide a steady or continuing indication, the above-described emission of pulses should be repeated at regular intervals which are of such length that successive groups of pulses are received before the indications from immediately preceding groups have perceptibly faded out. An indicator providing indications of reasonably long persistence is, therefore, preferable so that the pulse repetition rate need not be unreasonably great.

In the same manner the difference between distances BC and DC can be determined.

The position of the mobile craft C with respect to stations A, B and D can then, obviously, be determined by "solving" either of the triangles ACD or DBC; that is, by determining any two of the distances AC, BC and DC or any two of the angles made with the base line AD by lines AC, BC and DC.

As indicated in Fig. 1, c and d are the distances between the transmitting stations A and B, and B and D, respectively, and are known. If the distance BC is designated as the unknown x, then distance AC will be $x+a$, where $a$ is the difference between AC and BC and is determined as described above. Likewise DC is $x+b$, where $b$ is the difference between DC and BC and is also determined as described above.

By elementary trigonometry, in any triangle having, for example, sides $k$, $l$ and $m$, an angle M opposite side $m$, and a perimeter $p$;

$$\cos \tfrac{1}{2}M = \sqrt{\frac{\tfrac{p}{2}\left(\tfrac{p}{2}-m\right)}{kl}} \qquad (1)$$

Considering triangles ABC and ADC of Fig. 1;

$$P_{ABC} = 2x + a + c = 2s \qquad (2)$$
$$P_{ADC} = 2x + a + c + b + d = 2s' \qquad (3)$$

where $s$ and $s'$ are the semiperimeters of triangles ABC and ADC, respectively.

Applying Equation 1 above, to triangles ABC and ADC:

$$\cos \tfrac{1}{2}A = \sqrt{\frac{s(s-x)}{(x+a)c}} \qquad (4)$$

$$\cos \tfrac{1}{2}A = \sqrt{\frac{s'(s'-x-b)}{(x+a)(c+d)}} \qquad (5)$$

where A is the angle DAC in both of Equations 4 and 5.

Solving for $x$;

$$x = \frac{c\left(\tfrac{a+b+c+d}{2}-b\right)\left(\tfrac{a+b+c+d}{2}\right)-(c+d)\left(\tfrac{a+c}{2}\right)^2}{(c+d)\left(\tfrac{a+c}{2}\right)-c\left(\tfrac{a+b+c+d}{2}-b\right)} \qquad (6)$$

Since all terms of the right-hand side of Equation 6 are known the value of $x$ can be determined and with it the distance and direction of the receiving station from each transmitting station.

Alternatively, since the locus of all points for which the difference between the distances to two fixed points is constant is a hyperbola, the two fixed points being the foci thereof, a hyperbolic locus for the position of the mobile craft with respect to each of the respective pairs of fixed transmitting stations can be plotted and the intersection of any two such hyperbolic loci will definitely fix the position of the mobile craft. The principles involved are, of course, well known and various arrangements making use of such hyperbolic loci are shown, for example, in U. S. Patents 2,144,203, issued January 17, 1939, to J. P. Shanklin; Patent 2,198,113, issued April 23, 1940, to P. J. Holmes; Patent 2,148,267, issued February 21, 1939, to E. A. H. Honore; Patent 2,133,303, issued October 18, 1938, to C. B. Mirick; copending application Serial No. 436,995, filed March 31, 1942, in the name of W. M. Goodall, Patent No. 2,408,773, issued October 8, 1946; and numerous other patents and published articles.

A conventional arrangement of the transmitting stations of Fig. 1 suitable for practicing the invention is shown in Fig. 5, where, as taught in the above-mentioned application of W. M. Goodall, a standard frequency oscillator 500 is provided from which synchronization of the transmitting stations can be effected. Oscillator 500 can preferably be of the precision crystal-controlled type and can be located at any one of the transmitting stations, for example, at station D. Its frequency is transmitted to the other stations by radio by auxiliary transmitter 501 and antenna 503 in the general manner described in the above-mentioned application of W. M. Goodall.

In accordance with well-known practices in the art the frequency of transmitter 501 is preferably made substantially different from that of transmitters 506 and 514 and serves as a "carrier" which is modulated by standard frequency oscillator 500. The other stations A and B can be substantially identical and are equipped with an auxiliary antenna 511 and auxiliary receiver 509, which latter detects the standard frequency modulation imparted to the carrier by oscillator 500 and amplifies it suitably for use at the stations A and B.

At each of the transmitting stations A, B or D the standard frequency originating in oscillator 500 (detected and amplified in receiver 509 for stations A and B) is passed through an adjustable time delay unit 502 for station D, or 510 for stations A and B, so that transmission time delays and fortuitous time delay differences between apparatus units at the several stations, can be compensated.

Each adjustable time delay unit connects to a modulator or pulse generator, 504 at station D, or 512 at stations A and B, which respond to the standard frequency by generating groups of accurately timed pulses. These modulators can be of the well-known rotating commutator-switch type, driven by synchronous motors which in turn are driven by the standard frequency, or they may be of any of the numerous well-known electronic-switching pulse-generating circuits such as are commonly employed in television systems or in radar systems well known in the art. Alternatively the modulating arrangement described in the patent to R. W. Hart, 1,924,156, issued August 29, 1933, can be employed in conjunction with a synchronous-motor-driven commutator switch, or a multivibrator, responsive to the standard frequency to furnish an unblanking pulse of appropriate duration to pass the desired number of pulses at a particular portion of each cycle of the standard frequency.

The pulses provided by the modulators are impressed upon control circuits of their respective transmitters, 506 for station D, 514 for stations A and B, and cause them to energize their associated antennas, 508 for station D, 516 for stations A and B to emit the required groups of radio energy pulses, timed as illustrated, for example, in Figs. 2 to 4, inclusive.

In Fig. 6 a conventional form for receiving station C of Fig. 1 is shown in block-diagram form. It comprises an antenna 600, a radio receiver 602, which is arranged to be readily tuned to any pair of the several wavelengths which are to be used in transmitting the pulse series, and an indicator 10. Indicator 10 comprises a cathode ray indicator 604, associated with which is a sweep generator 606 and an adjustable frequency oscillator 608. Units 608 and 606 can preferably provide a circular trace with received pulses producing lateral serrations thereon, substantially as described in the above-mentioned patent to Hart.

Oscillator 608 should have a frequency substantially equal to the pulse series repetition rate at which the transmitters of the system operate and should be adjustable over a small range so that it can be brought precisely to that repetition frequency and the pulse patterns will then remain stationary on the screen of the cathode ray indicator. Obviously, if the oscillator frequency differs from the repetition frequency, the pulse patterns will occur at different positions in each circular sweep and will consequently appear to move or travel around the circular sweep.

The received radio energy pulses are amplified and detected in radio receiver 602 and impressed upon the indicator as shown, for example, in the above-mentioned patent to Hart. The pulse series from a selected pair of transmitting stations are simultaneously displayed on the circular trace as shown in Figs. 2 to 4, inclusive, the interpretation of which will be discussed in detail hereinafter.

Pulses from each transmitting station can, obviously, be readily identified since the combination of the transmitting frequency and the pulse grouping can be made unique for each station. For example, station A can transmit pulses spaced 100 microseconds apart on a radio frequency X, station B can transmit pulses spaced 90 microseconds apart on a radio frequency Y and station D can transmit pulses spaced 100 microseconds apart on a radio frequency Z. The operator at the receiving station therefore need only tune his receiver to a pair of radio frequencies corresponding to an appropriate pair of the stations which are known to be transmitting the desired particular respective spaced pulses. Obviously, of the pair of stations selected in each case, one must be transmitting pulses spaced 100 microseconds apart and the other must be transmitting pulses spaced 90 microseconds apart in order to obtain the advantage of the vernier feature in accordance with this invention. The tuning of the receiver, therefore, determines which two stations are being received and the spacing of the pulse series as displayed on the oscilloscope identifies each pulse series with respect to its particular transmitting station.

Each pair of transmitting stations can, obviously, be conveniently synchronized by placing a test receiving station at a point known to be equidistant from both stations and then adjusting the time delay units at the transmitting stations until the significant signals (i. e., the initial pulses of the two series) from both stations arrive at the test station in exact synchronism. Alternatively, a test receiving station at any point from which the distances with respect to the two stations to be synchronized are known can obviously be employed if suitable allowance is made for any difference between the known distances.

It is further obvious, that the general method of fixing the position of the mobile object described above can be readily applied to the converse problem of determining the position of the mobile object at a fixed station with respect to several fixed receiving stations. In such a system the mobile object need only transmit periodic energy pulses and the differences in distance to several pairs of fixed receiving stations is then determined by noting at some central observation point connected by suitable land lines to the fixed receiving stations the time interval between the receipt of the emitted pulses at the fixed receiving stations of each pair and establishing two hyperbolic loci, one intersection of which will indicate the position of the mobile object.

Each pair of hyperbolic loci will, of course, have two points of intersection, one of which can usually be ignored since the object will usually be known to be on a particular side of the base line, or general line on which the receiving stations are located. Where ambiguity might possibly arise, large reflectors can be used adjacent one side of the receiving antennas to prevent the reception of energy from that side or one or more antennas having suitable directive properties can be employed.

For systems of the invention and kindred systems the required hyperbolic loci can be plotted to a reduced scale by mechanical methods well known to those skilled in the art or they can be obtained on a cathode ray indicator by specially designed electrical sweep circuits combining sawtooth and sine wave sweep voltages, several such circuit arrangements already being known to those skilled in the art. The point at which a specific hyperbolic trace must cross the transverse axis, i. e., the axis through the foci, is, of course, determined by the measured difference in distance between the mobile object and the stations of a selected pair of fixed stations. The foci of the specific hyperbolic trace are, of course, the points at which the pair of fixed stations are located, respectively, and together with the point at which the trace crosses the transverse axis, completely define the specific trace. Alternatively a cathode ray oscilloscope may be employed with a simple linear trace (saw-tooth wave deflecting voltage only required) and the ray may be subjected to "positive distortion" by an "electronic lens" until the desired hyperbolic trace is obtained. In this connection see the book entitled "Electron optics," by L. M. Myers, published by D. Van Nostrand Co. Inc., New York, 1939, at pages 455 and 456 and Fig. 269. A further obvious possibility is the use of an electro-optical oscilloscope in which a light beam is deflected linearly and "positive distortion," as required, is introduced by an optical lens to provide the desired hyperbolic traces. See the book entitled "The Principles of Optics," by A. C. Hardy and F. H. Perrin, published by McGraw Hill Book Company, Inc., New York, 1932, at page 106, paragraph 55 and Fig. 49B.

Numerous modifications of the illustrative system of Fig. 1 can readily be made by those skilled in the art. For example, additional transmitting stations can obviously be employed or the relative spacing of the stations can be rearranged so that for a mobile craft in any portion of a particular area to be covered by the navigation service, a sufficient number of pairs of appropriately located transmitting stations will be available to permit accurate position determinations to be made. Obviously too, each pair of transmitters can define a particular "beacon" course, if desired, since at all points along the line constituting the perpendicular bisector of the line joining the two stations of each pair, the signals from the two stations of the pair will be received simultaneously; i. e., all points along said bisector are equidistant from the two stations.

The indicator 10 of Fig. 1 can preferably be of the cathode ray type, the ray of which is repeatedly deflected at a uniform rate over a predetermined regular path on the screen of the tube. The familiar circular trace, one form and use of which is shown, for example, in U. S. Patent 1,924,156, issued August 29, 1933, to R. W. Hart, is perhaps best suited for use in systems of the present invention, though a straight line trace could obviously also conveniently be employed. Assuming a circular trace, the ray can, for example, preferably complete precisely one circular trace in the time interval between successive repetitions of the pulses by the transmitting stations of the system. Since the thing being measured is the time interval between the receipt of particular pulses from the two stations, it is not necessary to synchronize the start of each complete trace with any particular point in the time cycle, though it might be convenient in some cases, for example to introduce an adjustable delay device preceding the indicator so that the pulse first received could be aligned with a reference or "zero" mark and thus permit the use of a fixed scale associated with the screen of the indicator.

In accordance with a particular feature of the invention, the transmitting stations of the system are each caused to emit a series of pulses, the stations are paired as described above and the first pulse of both stations of each pair are emitted simultaneously. Furthermore, the pulses of the series for the stations of each pair are spaced in time so that one series of pulses bears a vernier relation with respect to the other. The two series of pulses from the two stations of each pair are then received at the mobile craft and both series of pulses are displayed simultaneously upon a common indicator whereupon the coincidence of a particular pulse of one series with a particular pulse of the other series (or in some cases the symmetry of the position of a pair of pulses of one series with respect to a pair of pulses of the other series) affords additional ease and accuracy in determining the time relation between the initial pulses of the two series as received at the mobile craft.

The above-described particular feature will be more readily understood from inspection of Figs. 2 to 4, inclusive, and the description thereof, given hereinafter. Figs. 2 to 4, inclusive, represent typical specific indications obtained with systems of the invention in which paired transmitting stations A and B, for example, emit vernierly related pulse series.

In more detail in Fig. 2, 250 represents the screen of a cathode ray indicator which can, for example, be indicator 10 of Fig. 1. Signals 200 to 218, inclusive, are received from station A of Fig. 1, for example, and signals 220 to 240, inclusive, are received from station B of Fig. 1. Signals 200 to 218, inclusive, are spaced at intervals of 100 microseconds and signals 220 to 240, inclusive, are spaced at intervals of 90 microseconds. The more closely spaced signals represent the "vernier" scale, of course, since ten intervals of 90 microseconds each equal nine intervals of 100 microseconds each, of the other or "normal" scale. In using such an arrangement the correct reading is, of course, indicated by the position of an end of the "vernier" scale with respect to the "normal" scale. In Fig. 2, therefore, the proper reading is indicated by the position of the end "vernier" pulse 220 and the "vernier" pulse 224 which is the first "vernier" pulse to coincide with a "normal" pulse (206). The correct reading is 240 microseconds as shown in Fig. 2. Since for the reading of Fig. 2 the receiver is nearer to signal A source, the A or "normal" scale signals will, under normal conditions, be of greater amplitude. As radio waves travel at the speed of light which is approximately 1000 feet per microsecond, the above reading would indicate that the mobile craft receiving the signals illustrated in Fig. 2 is approximately 240,000 feet or approximately 50 miles nearer station A than station B.

In Fig. 3, signals 300 to 318, inclusive, and 320 to 340, inclusive, from stations A and B, respectively, are received on a mobile craft nearer station B and are shown on oscilloscope screen 350. In this instance the end "vernier" pulse 340 indicates the proper reading and the fourth "vernier" pulse 336 from this end pulse furnishes the fractional reading, the total reading being, as indicated, 540 microseconds. In this case the receiver is approximately 540,000 feet or approximately 108 miles nearer station B than station A.

In Fig. 4 a possible "special case" is illustrated on oscilloscope screen 450 in which there is no coincidence of a "vernier" pulse with a "normal" pulse. There will, however, be a pair of "vernier" pulses 424, 425 which are symmetrically positioned with respect to a pair of normal pulses 407, 408 indicating a vernier reading, as illustrated, of 45 microseconds, the total correct reading being 245 microseconds, as illustrated. The signals from station A are, of course, signals 400 to 418, inclusive, and those from station B are signals 420 to 440, inclusive. The mobile craft in this instance is nearer to station A by approximately 51 miles.

Numerous other modifications and applications of the teachings and principles of the invention obviously can readily be devised by those skilled in the art. For example, straight rather than circular oscilloscope traces can be employed or movable vernierly-related scales can be provided on the surface of the target and single "marker" pulses followed by identification pulses can be transmitted and the aforesaid scales moved into proper relationship with the respective "marker" pulses from a pair of transmitting stations in order to provide a "vernier" reading, or the principles of the invention can be readily applied to submarine compressional wave navigational-aiding systems and the like without departing from the spirit and scope of the invention. The invention is defined in the following claims.

What is claimed is:

1. In a long range navigational system for mobile craft, a pair of transmitting stations at known fixed positions, each of said stations transmitting a series of pulses, the first pulse of both series being transmitted simultaneously from said stations, the pulses of both series being uniformly spaced and those of one series bearing a vernier relation with respect to those of the other series, a mobile craft remote from said stations, a receiver on said craft for receiving both said transmitted series of pulses, and an indicator associated with said receiver for displaying both series of pulses simultaneously in juxtaposition, whereby the difference in time of travel of one series of pulses with respect to the other series and the difference between the respective distances to said transmitting stations can be accurately determined with greater facility.

2. In a system for determining at a receiving station the difference between the distances to two remote transmitting stations the combination which includes means at said remote stations for transmitting in known time relation a series of regularly spaced pulses from each station, the spacing of pulses for one series bearing a vernier relation with respect to the spacing of pulses for the other series and means at said receiving station for receiving and displaying both series of pulses simultaneously, in juxtaposition, on a common indicating device.

3. A system for timing the arrival at a receiving station of a signal from a first transmitting station with respect to the time of arrival of a signal from a second transmitting station which includes means at each transmitting station for transmitting a series of regularly spaced signals, the series from one station bearing a vernier relation to that from the other, means at said receiving station for receiving both series of signals and means for simultaneously displaying both sets of signals, in juxtaposition, along a common time trace.

RALPH BOWN.

REFERENCES CITED

The following references are of record in the file of this patent:

UNITED STATES PATENTS

| Number | Name | Date |
|---|---|---|
| 2,178,074 | Jakel et al. | Oct. 31, 1939 |
| 2,192,975 | Kotowski et al. | Mar. 12, 1940 |
| 2,144,203 | Shanklin | Jan. 17, 1939 |
| 2,198,113 | Holmes | Apr. 23, 1940 |
| 2,148,267 | Honore | Feb. 21, 1939 |
| 2,133,303 | Mirick | Oct. 18, 1938 |
| 2,408,773 | Goodall | Oct. 8, 1946 |
| 1,924,156 | Hart | Aug. 29, 1933 |
| 1,406,996 | Morrill | Feb. 21, 1922 |
| 2,171,536 | Bingley | Sept. 5, 1939 |

FOREIGN PATENTS

| Number | Country | Date |
|---|---|---|
| 596,671 | Germany | May 6, 1934 |